(12) United States Patent
Chi et al.

(10) Patent No.: US 9,485,639 B2
(45) Date of Patent: Nov. 1, 2016

(54) METHOD AND DEVICE FOR ADJUSTING AND PROCESSING RINGTONE

(75) Inventors: Xin Chi, Shenzhen (CN); Chunfan Ji, Shenzhen (CN); Shaohua Wu, Shenzhen (CN); Zhongbo Han, Shenzhen (CN); Guolin Teng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/401,160

(22) PCT Filed: Jun. 29, 2012

(86) PCT No.: PCT/CN2012/077969
§ 371 (c)(1),
(2), (4) Date: Nov. 14, 2014

(87) PCT Pub. No.: WO2013/170522
PCT Pub. Date: Nov. 21, 2013

(65) Prior Publication Data
US 2015/0156614 A1    Jun. 4, 2015

(30) Foreign Application Priority Data

May 14, 2012    (CN) .......................... 2012 1 0149619

(51) Int. Cl.
*H04W 4/16*    (2009.01)
*H04W 4/02*    (2009.01)
(Continued)

(52) U.S. Cl.
CPC ............... *H04W 4/16* (2013.01); *H04M 19/04* (2013.01); *H04M 19/041* (2013.01); *H04M 19/044* (2013.01); *H04W 68/00* (2013.01)

(58) Field of Classification Search
CPC ............. H04M 19/044; H04M 19/04; H04M 19/041; H04M 1/72572; H04M 3/42051; H04W 36/0083; H04W 48/02; H04W 4/16; H04W 68/00; H04W 4/023; H04W 4/12; H04W 4/18
USPC ............... 455/436, 440, 441, 448, 461, 559, 455/414.1, 417, 445, 458; 370/331, 332
See application file for complete search history.

(56) References Cited

U.S. PATENT DOCUMENTS 8,620,319 B1 * 12/2013 Thandu ................. H04W 48/02
                                                   370/331
2005/0282590 A1    12/2005 Haparnas
(Continued)

FOREIGN PATENT DOCUMENTS

CN    1270735 A    10/2000
CN    101304455 A    11/2008
(Continued)

OTHER PUBLICATIONS

International Search Report for corresponding application PCT/CN2012/077969 filed Jun. 29, 2012; Mail date Feb. 28, 2013.
(Continued)

*Primary Examiner* — Inder Mehra
(74) *Attorney, Agent, or Firm* — Cantor Colburn LLP (57) ABSTRACT

A method and device for adjusting and processing ringtone is Provided, the method comprising: when a user equipment (UE) plays a ringtone, acquiring environmental audio data, the environmental audio data comprises the ringtone data played by the UE and the external environment noise data of the UE; analyzing the characteristic parameter of the ringtone played by the UE according to the acquired audio data; and adjusting the ringtone played by the UE according to the characteristic parameter. The disclosure solves the problem in the related art of how to automatically and accurately adjust the ringtone of a UE on the basis of different environments, thus achieving the effect of accurately adjusting the ringtone of the UE on the basis of different environments.

9 Claims, 5 Drawing Sheets

(51) Int. Cl.
*H04W 4/12* (2009.01)
*H04W 4/18* (2009.01)
*H04W 68/00* (2009.01)
*H04M 19/04* (2006.01)

(56) References Cited

U.S. PATENT DOCUMENTS

2008/0161064 A1* 7/2008 Lewis .................... H04M 19/04
    455/567
2012/0039489 A1* 2/2012 Chen ........................ H03G 3/32
    381/107

FOREIGN PATENT DOCUMENTS

| | | | | |
|---|---|---|---|---|
| CN | 102316200 A | 1/2012 | | |
| CN | 102164203 A | 8/2014 | | |
| EP | 1168783 A2 | 1/2002 | | |
| JP | CN102164203 | * | 8/2011 | ............ H04M 1/725 |
| WO | 9905850 A1 | 2/1999 | | |

OTHER PUBLICATIONS

European Search Report for corresponding application EP 12 87 6804; Report dated Mar. 16, 2015.

* cited by examiner

METHOD AND DEVICE FOR ADJUSTING AND PROCESSING RINGTONE

TECHNICAL FIELD

The disclosure relates to the field of communications including e.g., a method and device for adjusting and processing ringtone.

BACKGROUND

In everyday life, mobile phones are used in many environments, sometimes in a quiet office, and sometimes on a high noise street, and sometimes the mobile phone is placed in a pocket or a mobile phone cover of better sealing. There are large environmental noises in the Areas such as a workshop, a road and a machine room, while areas such as an office and a room are relatively quiet. When a person switches in the two environments, it is difficult to choose an appropriate ringtone; if the ringtone is too loud, it is too noisy in a quiet environment, and if the ringtone is too low, it cannot be heard in a noisy environment. If the ringtone is set every time when the environment is changed, it would be too troublesome. Therefore, with regard to these medium noise interferences, and in order to answer a call in time, a user is usually required to turn up the volume of the ringtone manually when the user enters into a high noise environment, while after entering into a relatively quiet environment, the volume is required to be turned down in order to prevent too loud ringtone becoming noises. But the operation brings big trouble, and many users choose to set the ringtone to be of a relative medium volume, but obviously this will bring the problem that the ringtone is noisy in a quiet environment while it is not easy to answer a call in a noise environment. However, when the mobile phone is placed in a pocket of clothes, a mobile phone cover or a backpack, the speaker of the mobile phone is covered by the medium, which seriously influences sound propagation, so the sound becomes very low which easily leads to miss a call; therefore, nothing can be done for the obstruction on sound propagation when the mobile phone is placed in a shielding object.

With regard to the above-mentioned problems, the relevant technology proposes a method which can firstly detect the magnitude of environmental noises, and then determine the volume degree of the ringtone, and this method can solve the problem caused by switching in high and low noise environments in certain degree, but can do noting for the mobile phone placed in a shielding object, mainly because the speaker is also covered by the shielding object at the same time, and this will lead to that the detected strength of the noise is inaccurate, and even a noisy environment will also be misjudged to be a quiet environment and the ringtone is not turned up in time, which easily leads to missing a call.

Therefore, with regard to how to automatically adjust the ringtone of a user equipment accurately according to different environments, there is no corresponding solution in the related art.

SUMMARY

A method and device for adjusting and processing ringtone is provided in the embodiments of the disclosure, so as to at least solve the problem of how to automatically adjusts the ringtone of a user equipment accurately according to different environments in the related art.

According to one aspect of the embodiments of the disclosure, a method for adjusting and processing ringtone is provided, comprising: when a user equipment plays a ringtone, acquiring environmental audio data, wherein the environmental audio data comprises: ringtone data played by the user equipment and external environment noise data of the user equipment; analyzing a characteristic parameter of the ringtone played by the user equipment according to the acquired audio data combined with the played ringtone data; and adjusting the ringtone played by the user equipment according to the characteristic parameter.

According to the embodiment of the invention, the characteristic parameter of the ringtone comprises at least one of the following: the strength of the ringtone, and a signal-to-noise ratio of the ringtone.

According to the embodiment of the invention, when the characteristic parameter of the ringtone comprises the strength of the ringtone, before adjusting the ringtone played by the user equipment according to the characteristic parameter, further comprising: comparing the strength of the ringtone with a predicted strength corresponding to the magnitude of the ringtone played by the user equipment; and based on that the difference value between the strength of the ringtone and the predicted strength corresponding to the magnitude of the ringtone played by the user equipment is greater than a first threshold value, determining to adjust the ringtone played by the user equipment.

According to the embodiment of the invention, when the characteristic parameter of the ringtone comprises the signal-to-noise ratio of the ringtone, before adjusting the ringtone played by the user equipment according to the characteristic parameter, further comprising: comparing the signal-to-noise ratio of the ringtone with an anticipated signal-to-noise ratio; and based on that the signal-to-noise ratio of the ringtone is less than the anticipated signal-to-noise ratio, determining to adjust the ringtone played by the user equipment.

According to the embodiment of the invention, adjusting the ringtone played by the user equipment according to the characteristic parameter, comprising at least one of the following: when the characteristic parameter comprises the strength of the ringtone, adjusting the strength of the ringtone played by the user equipment so as to make the strength of the ringtone reach a predetermined ringtone strength; and when the characteristic parameter comprises the signal-to-noise ratio of the ringtone, adjusting the strength of the ringtone played by the user equipment so as to make the signal-to-noise ratio of the ringtone reach a predetermined ringtone signal-to-noise ratio.

According to the embodiment of the invention, after the strength of the ringtone reaches the predetermined ringtone strength and/or the signal-to-noise ratio of the ringtone reaches the predetermined ringtone signal-to-noise ratio, the method further comprising: after a predetermined duration, re-acquiring the audio data.

According to another aspect of the embodiments of the disclosure, a ringtone adjustment and processing device is provided, comprising: an acquiring component, configured to, when a user equipment plays a ringtone, acquire environmental audio data, wherein the environmental audio data comprises: ringtone data played by the user equipment and external environment noise data of the user equipment; an analysing component, configured to analyze a characteristic parameter of the ringtone played by the user equipment according to the acquired audio data combined with the played ringtone data; and an adjusting component, configured to adjust the ringtone played by the user equipment according to the characteristic parameter.

Preferably, further comprising: a first comparing component, configured to compare the strength of the ringtone with a predicted strength corresponding to the magnitude of the ringtone played by the user equipment; and a first determining component, configured to, based on that the difference value between the strength of the ringtone and the predicted strength corresponding to the magnitude of the ringtone played by the user equipment is greater than a first threshold value, determine to adjust the ringtone played by the user equipment.

According to the embodiment of the invention, further comprising: a second comparing component, configured to compare the signal-to-noise ratio of the ringtone with an anticipated signal-to-noise ratio; and a second determining component, configured to, based on that the signal-to-noise ratio of the ringtone is less than the anticipated signal-to-noise ratio, determine to adjust the ringtone played by the user equipment.

According to the embodiment of the invention, the adjusting component, configured to adjust the ringtone played by the user equipment according to the characteristic parameter, comprising at least one of the following: when the characteristic parameter comprises the strength of the ringtone, adjusting the strength of the ringtone played by the user equipment so as to make the strength of the ringtone reach a predetermined ringtone strength; and when the characteristic parameter comprises the signal-to-noise ratio of the ringtone, adjusting the strength of the ringtone played by the user equipment so as to make the signal-to-noise ratio of the ringtone reach a predetermined ringtone signal-to-noise ratio.

Through the embodiments of the disclosure, using that when a user equipment plays a ringtone, acquiring environmental audio data, wherein the environmental audio data comprises: ringtone data played by the user equipment and external environment noise data of the user equipment; analyzing a characteristic parameter of the ringtone played by the user equipment according to the acquired audio data combined with the played ringtone data; and adjusting the ringtone played by the user equipment according to the characteristic parameter. The disclosure solves the problem in the related art of how to automatically and accurately adjust the ringtone of a user equipment according to different environments, thus achieving the effect of accurately adjusting the ringtone of the user equipment according to different environments.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the accompanying drawings.

DESCRIPTION OF EMBODIMENTS

The preferred embodiments are described in conjunction with the drawings as follows. It should be noted that the embodiments and the characteristics of the embodiments can be combined with each other if no conflict is caused.

Figure 1:
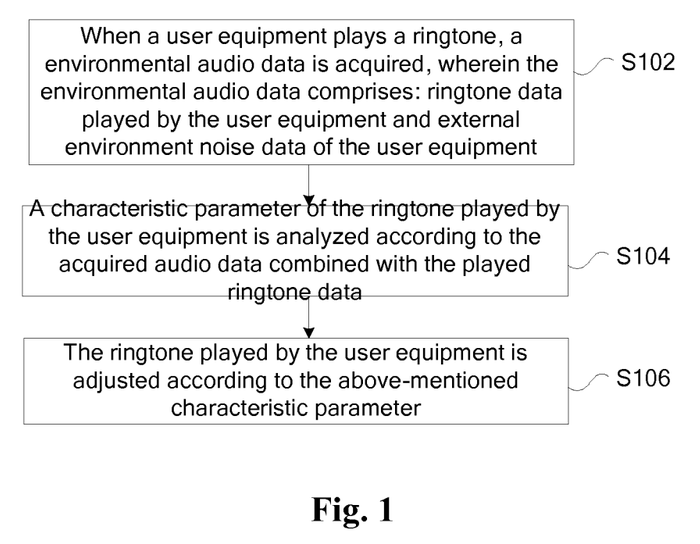
FIG. 1 shows a flowchart of a method for adjusting and processing ringtone according to the embodiments of the disclosure.

A method for adjusting and processing ringtone is provided in the present embodiment. FIG. 1 is a flowchart of a method for adjusting and processing ringtone according to the embodiments of the disclosure, and as shown in FIG. 1, the flow comprises the following steps:

step S102, when a user equipment plays a ringtone, an environmental audio data is acquired, wherein the environmental audio data comprises: ringtone data played by the user equipment and external environment noise data of the user equipment;

step S104, a characteristic parameter of the ringtone played by the user equipment is analyzed according to the acquired audio data combined with the played ringtone data, for example, the characteristic parameter can be the ringtone strength and/or the signal-to-noise ratio of the ringtone;

and step S106, the ringtone played by the user equipment is adjusted according to the above-mentioned characteristic parameter.

Through the above-mentioned steps, the ringtone is adjusted by acquiring the characteristic parameter of the played ringtone. The characteristic parameter accurately simulates a scene of a user listening to the ringtone, and the data at the time is acquired when the ringtone is played, and therefore, a currently specific environment can be learned accurately so that reliable judgement is provided for whether the ringtone can be heard accurately, which not only solves the problem of troublesome switching caused by manually adjusting the ringtone in different environments in the related art, but also can solve the problem of influencing the use of a user equipment caused by inaccurate ringtone detection in certain degree due to a user equipment being of a shielding state; through the characteristic parameter of the ringtone used by the present method, the user equipment is enabled to automatically adjust the ringtone according to different environments, and the state of the user equipment can be directly judged according to the characteristic parameter of the ringtone, and therefore the situation of a user in the shielding state listening to the ringtone inaccurately can be effectively avoided, and the user experience is improved.

Different characteristic parameters are selected, and before adjusting the ringtone played by the user equipment, standards for corresponding judgement are also different, for example, when the characteristic parameter of the ringtone comprises the strength of the ringtone, before adjusting the ringtone played by the user equipment according to the characteristic parameter, the strength of the ringtone can be compared with a predicted strength corresponding to the magnitude of the ringtone played by the user equipment; and based on that the difference value between the strength of the ringtone and the above-mentioned predicted strength is greater than a certain threshold value, it is determined to adjust the ringtone played by the user equipment. That is, before adjustment, the strength of the ringtone is compared with a predetermined value corresponding to a ringtone degree, and certainly the value can be a number value obtained by experience, for example, loss caused between a position where the user equipment collects the ringtone and a position where the ringtone is played, and certainly interference on the ringtone caused by the environment also can be added. Through comparing the magnitude of the ringtone with that of an original ringtone, so that the influence of an environmental factor is considered in the adjustment on the ringtone, and therefore more accurate adjustment on the ringtone is reached.

For another example, when the characteristic parameter of the ringtone comprises the signal-to-noise ratio of the ringtone, before adjusting the ringtone played by the user equipment according to the characteristic parameter, the signal-to-noise ratio of the ringtone also can be compared with a preset signal-to-noise ratio (or named an anticipated signal-to-noise ratio) corresponding to the volume degree; and based on that the signal-to-noise ratio of the ringtone is less than the preset signal-to-noise ratio, it is determined to adjust the ringtone played by the user equipment. The preset signal-to-noise ratio also can be acquired according to experience, also can be set according to a specific technology standard, and also can be set by a person according to habits of a user using the user equipment.

Manners for adjusting the ringtone played by a user equipment according to a characteristic parameter also can be of many kinds, for example, when the adjustment is performed according to different characteristic parameters, the following two processing manners can be used: (1) when the characteristic parameter comprises the strength of the ringtone, the magnitude of the ringtone played by the user equipment is adjusted so as to make the strength of the ringtone reach a predetermined ringtone strength, and it should be noted that the predetermined ringtone strength can be the ringtone strength expected by a user using the user equipment, i.e. an ideal and comfortable ringtone can be heard by a user under the ringtone strength. The predetermined ringtone strength also can be a ringtone strength preset by a mobile phone, and the ringtone strength here also can be named a second predicted ringtone strength. Comparing the second predicted ringtone strength with the predicted ringtone strength corresponding to the magnitude of the above-mentioned ringtone: the predicted ringtone strength corresponding to the magnitude of the above-mentioned ringtone indicates that the user using the user equipment can better distinguish the ringtone from the noise, while the above-mentioned second predicted ringtone strength can characterize that not only the user can distinguish the ringtone from the noise, but the ringtone is rather ideal and comfortable. Certainly, in specific setting, the above-mentioned two predetermined ringtone strengths can be the same and also can be different. When being the same, it means that the ringtone is adjusted to an ideal ringtone as long as the adjustment is performed, while when being different, then corresponding adjustment can be performed for different requirement degrees. Although the adjustment is not the most ideal in every time, it belongs to the range which can be accepted by the user, and certainly will not cause huge influence on the user listening to the ringtone.

(2) When the characteristic parameter comprises the signal-to-noise ratio of the ringtone, the strength of the ringtone played by the user equipment is adjusted so as to make the signal-to-noise ratio of the ringtone reach a predetermined ringtone signal-to-noise ratio. The pointed ringtone strength mentioned above is also applicable to the situation of an anticipated ringtone signal-to-noise ratio, which is mainly to make the adjustment on the ringtone reach an anticipated effect. It should be noted that using the above-mentioned two manners can be selected according to specific situations, and certainly the two also can be combined for use.

No matter which of the above-mentioned manners is used to adjust the ringtone played by the user equipment, after acquiring the characteristic parameter of the ringtone, the order of adjustment also can be set. For example, the user equipment can be set to be adjusted according to the ascending sequence, and in addition, with regard to the specific adjustment amplitude, it can be rationally selected according to the value of the determined characteristic parameter. For example, multiple ladders of the ringtone adjustment are set before the adjustment, and when the difference value between the characteristic parameter of the ringtone and a predetermined reference value is rather larger, an adjustment manner of larger ladder can be used, while when the difference value is smaller, an adjustment manner of small ladder is used. The ladder can be uniform, and also can be non-uniform. In addition, after the strength of the ringtone reaches the predetermined ringtone strength and/or the signal-to-noise ratio of the ringtone reaches the predetermined ringtone signal-to-noise ratio, a predetermined duration can be provided, and after the predetermined duration, environmental audio data is re-acquired, and the ringtone of the user equipment is adjusted according to the re-acquired environmental audio data so as to make the adjustment on the user equipment gradually close to the predicted ringtone. The setting of the predetermined duration not only can enable the user equipment to perform corresponding adjustment according to different environments, but also make the adjustment on the user equipment not too frequent.

A device for adjusting and processing ringtone is provided in the embodiment, and the device is used to realize the above-mentioned embodiment and preferred embodiment, and there is no further description for what is described already. As used in the following, the term "component" is a combination of softwares and/or hardwares which can realize predetermined functions. Although the device described in the following embodiment is preferably realized by softwares, the realization by hardwares or the combination of softwares and hardwares is also possible and conceived.

Figure 2:
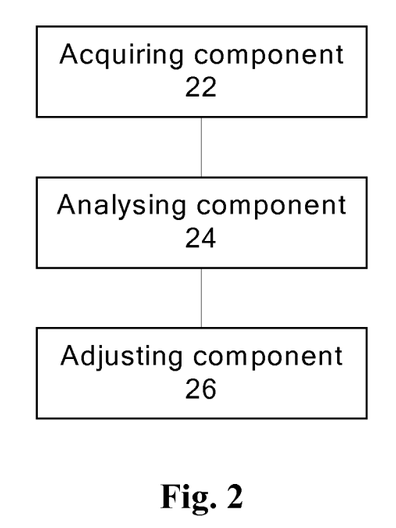
FIG. 2 shows a structure diagram of a device for adjusting and processing ringtone according to the embodiments of the disclosure.

FIG. 2 is a structure diagram of a device for adjusting and processing ringtone according to the embodiments of the disclosure, and as shown in FIG. 2, the device comprises an acquiring component 22, an analysing component 24 and an adjusting component 26. The device is described below.

The acquiring component 22, is configured to, when a user equipment plays a ringtone, acquire environmental audio data, wherein the environmental audio data comprises: ringtone data played by the user equipment and external environment noise data of the user equipment; an analysing component 24, connected to the above-mentioned acquiring component 22, is configured to analyze a characteristic parameter of the ringtone played by the user equipment according to the acquired audio data combined with the played ringtone data; and an adjusting component 26, connected to the above-mentioned analysing component 24, is configured to adjust the ringtone played by the user equipment according to the characteristic parameter.

Figure 3:
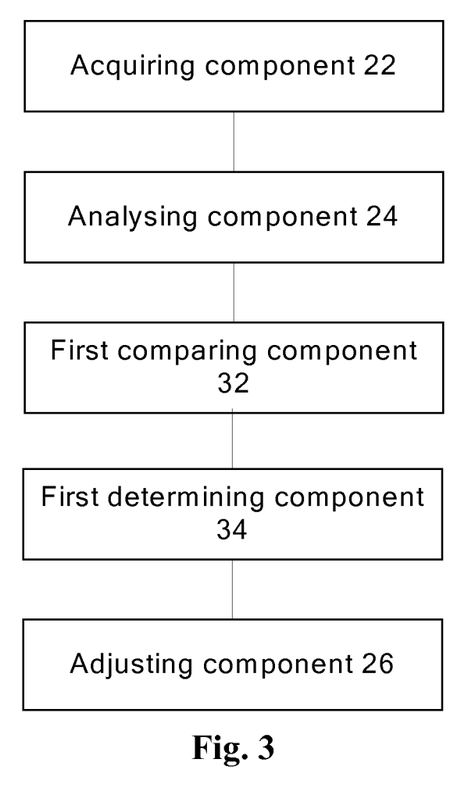
FIG. 3 shows a structure diagram of a device for adjusting and processing ringtone according to preferred embodiment one of the disclosure.

FIG. 3 shows a structure diagram of a device for adjusting and processing ringtone according to preferred embodiment one of the disclosure, and as shown in FIG. 3, the device further comprises, except comprising all the components shown in FIG. 2, a first comparing component 32 and a first determining component 34, and the preferred device is described below. The device further comprises: a first comparing component 32, is configured to compare the strength of the ringtone with a predicted strength corresponding to the magnitude of the ringtone played by the user equipment; and a first determining component 34, connected to the above-mentioned first comparing component 32, is configured to, based on that the difference value between the strength of the ringtone and the above-mentioned predicted strength is greater than a first threshold value, determine to adjust the ringtone played by the user equipment.

Figure 4:
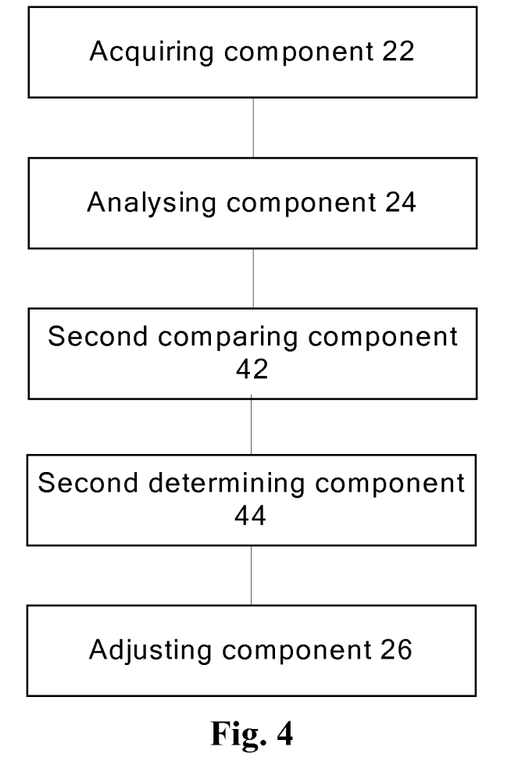
FIG. 4 shows a structure diagram of a device for adjusting and processing ringtone according to preferred embodiment two of the disclosure.

FIG. 4 shows a structure diagram of a device for adjusting and processing ringtone according to preferred embodiment two of the disclosure, and as shown in FIG. 4, the device further comprises, except comprising all the components shown in FIG. 2, a second comparing component 42 and a second determining component 44, and the device further comprises: a second comparing component 42, is configured to compare the signal-to-noise ratio of the ringtone with an anticipated signal-to-noise ratio; and a second determining component 44, connected to the above-mentioned second comparing component 42, is configured to, based on that the signal-to-noise ratio of the ringtone is less than the above-mentioned anticipated signal-to-noise ratio, determine to adjust the ringtone played by the user equipment.

According to the embodiment of the disclosure, the above-mentioned adjusting component 24, is configured to adjust the ringtone played by the user equipment according to the characteristic parameter, comprising at least one of the following: when the characteristic parameter comprises the strength of the ringtone, adjusting the strength of the ringtone played by the user equipment so as to make the strength of the ringtone reach a predetermined ringtone strength; and when the characteristic parameter comprises the signal-to-noise ratio of the ringtone, adjusting the strength of the ringtone played by the user equipment so as to make the signal-to-noise ratio of the ringtone reach a predetermined ringtone signal-to-noise ratio.

A method for self-adjusting to the sound environment where a terminal is located and improving audio quality in mobile communication is provided in the above-mentioned embodiment and preferred embodiment, and through the control method provided above which can provide comfortable ringtone volume for a user, the problem of missing a call when the user is in a high noise environment or the phone is covered is solved. The method and device for realizing automatically adjusting the ringtone volume of a mobile phone provided in the above-mentioned embodiment and preferred embodiment mainly solve the problem that a user cannot normally hearing the ringtone of a call, an alarm clock, etc. because the environment noise is high or the mobile phone is placed in a shielding-effect environment, such as a pocket of clothes, a backpack, etc. At the same time, by optimizing the algorithm of adjusting the ringtone volume, automatical control of the ringtone also can be realized, and the trouble of frequently adjusting the ringtone manually caused by often switching environment is avoided.

The core of the present embodiment is: a corresponding ringtone adjustment unit (equivalent to the functions of the determining component and the adjusting component in the above-mentioned embodiment or preferred embodiment) is set in a mobile phone, and when a call ringtone is played, external audio data is acquired in real time through an audio sampling component (equivalent to the acquiring component in the above-mentioned embodiment and preferred embodiment) like a mac. Since the mobile phone knows original data of the played ringtone, the signal-to-noise ratio of the ringtone in the outside environment can be obtained by analog calculation through a certain method, and whether human ears identifying the ringtone depends on the signal-to-noise ratio, and the ringtone adjustment unit can perform automatical control of the ringtone according to the signal-to-noise ratio. The strength of the ringtone can be calculated by using collected data and the original data, and transmission loss can be estimated by comparing some preset standard values, and this is possibly because that a transmission path is covered or shielded, so in this case, the reminding function can be enhanced through improving volume or other manners.

Compared with the related art, there are the following advantages by using the above-mentioned embodiment and preferred embodiment: (1) there is no need to add a new hardware to an existing mobile phone, which effectively saves cost, and a volume is usually collected by a mac, while extracting ringtone strength and signal-to-noise ratio and controlling volume can be realized by using a software. (2) The environment from a speaker to human ears can effectively be simulated by using a ringtone self-detection method, which can effectively solve the problem of influencing an answer because the mobile phone is placed in a shielding object. If the surface of the mobile phone is covered, the strength of the ringtone volume received by the mac will be obviously lower than being expected, thus the volume can be improved to ensure the ringtone being heard normally. (3) The volume adjustment of the ringtone is based on the signal-to-noise ratio of the ringtone, and since sense of hearing of human ears is based on the signal-to-noise ratio, the method is closer to real environment and produces comfortable user experience. Besides, the volume is adjusted constantly during the ring, which ensures not influencing the answer even if the environment is changed during the ring. (4) In the above-mentioned method, the strategy of performing ringtone adjustment through the ringtone strength and the signal-to-noise ratio can be configured and brings more flexibility. For example, the simplest is to set high, medium and low levels, and a ringtone control component controls whether the ringtone strength and the signal-to-noise ratio reaches an adjustment threshold value according to the above set.

In the following, with combination of the accompanying drawings, the embodiment of the disclosure is described.

Figure 5:
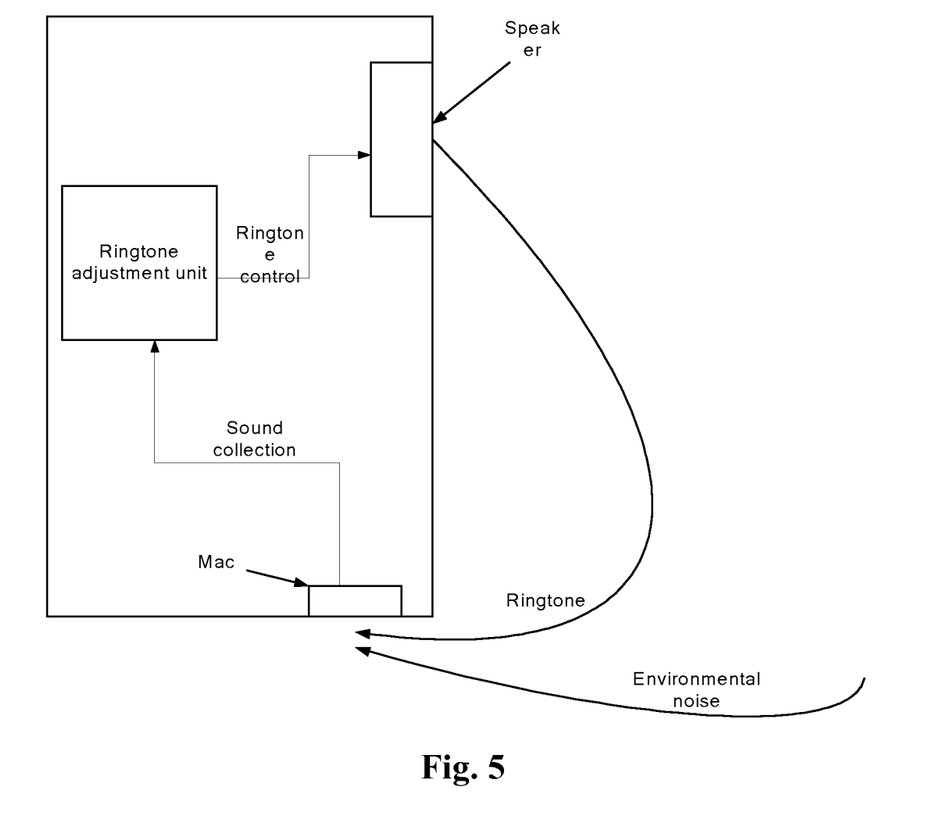
FIG. 5 shows a schematic diagram of a system for adjusting ringtone according to the embodiments of the disclosure.

FIG. 5 shows a schematic diagram of a system for adjusting ringtone according to the embodiments of the disclosure, and as shown in FIG. 5, the system comprises three main function components: a ringtone adjustment unit (equivalent to the functions of the determining component and the adjusting component in the above-mentioned embodiment or preferred embodiment), a speaker and a mac (equivalent to the acquiring component in the above-mentioned embodiment and preferred embodiment), wherein the speaker is used for outputting ringtone, and the mac is used for collecting external sounds, and the data comprises self-emitted ringtone and also comprises noises of the outside. The ringtone adjustment unit saves the outputted ringtone original data, and through computing the collected data, calculates the strength and the signal-to-noise ratio of currently outside ringtone, and the volume of the speaker is adjusted according to a preset certain rule.

That is, the environmental data collected by the mac comprises the ringtone and also comprises environmental noises at the same time. The data can mainly simulate sounds heard by human ears, and there is strength and signal-to-noise ratio deviation caused merely by the difference of distance. In order to make the acquired data more accurate, appropriate correction can be performed. The ringtone adjustment unit saves the audio original data outputted by the speaker, and by analyzing the collected environment data and the audio original data, the strength of the ringtone transmitted to the position of the mac and the signal-to-noise ratio of the ringtone in the current environment are obtained, and the control of the ringtone is realized by using the two parameters and through a certain rule.

By comparing the current volume with the detected ringtone strength, the covering situation of the external environment can be accurately obtained, for example, surfaces of the mac or speaker are covered by a pocket or placed in a mobile phone cover, etc. The noise of the current environment can be calculated by analyzing the signal-to-noise ratio; however, it is more direct for a volume adjusting component to use the signal-to-noise ratio to calculate, because it exactly represents whether a ringtone is easily distinguishable in the noises.

It should be noted that the ringtone automatic adjustment function can be used under many situations, typically being used as a scene mode, for example, the function is started in the case where a user does not answer for a long time so as to confirm whether there is a problem in the environment. The function not only can be used as prompts of notifications, such as a call ringtone and a short message of a user, but also can be used as an application, like an alarm which has sound interaction with the user. The strategy for mobile phone adjustment can be a fault pre-set of the mobile phone, also can be set according to a user selection, or also can be pre-configured according to a certain rule, and different settings are performed according to different user requirements, thereby providing user experience.

Two typical application scenarios are described below in detail.

I. Ringtone Automatic Adjustment as an Individually Scene Mode

Figure 6:
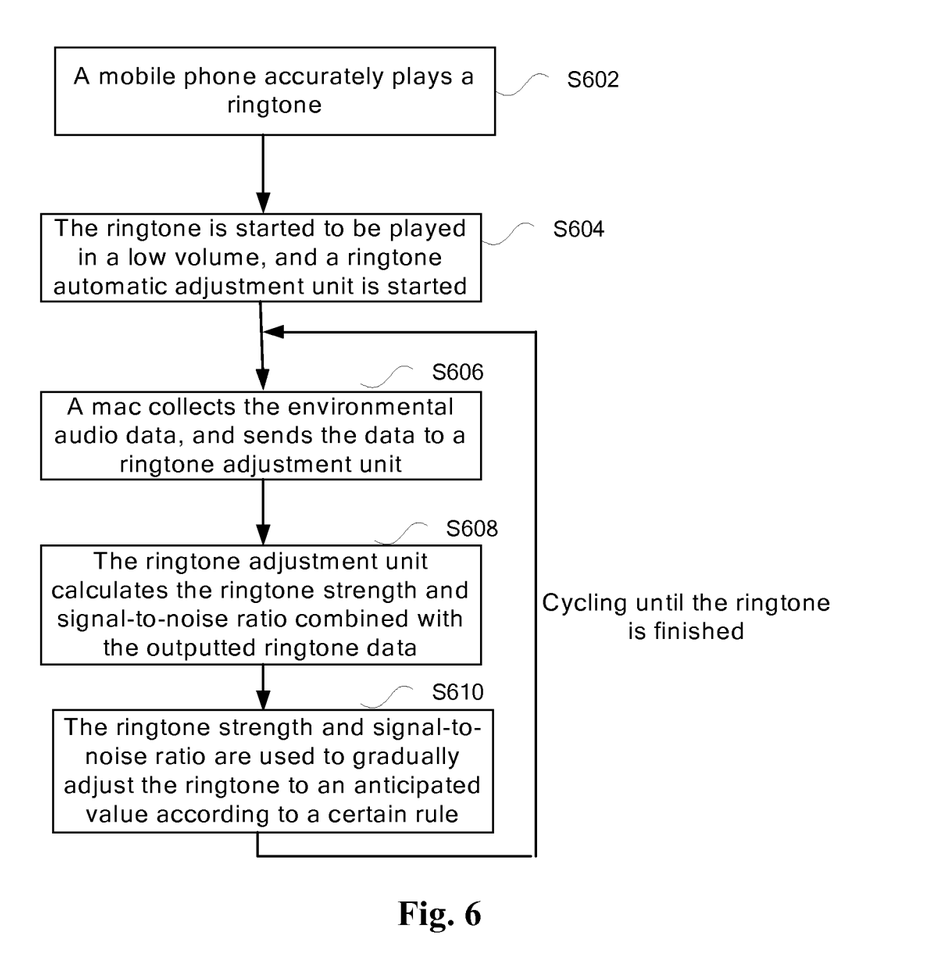
FIG. 6 shows a flowchart of a method for adjusting and processing ringtone according to the preferred embodiments of the disclosure.

Under this mode, a user does not need to set the ringtone volume, or is merely required to simply set the volume to be high, medium and low, and the automatical control of the ringtone is realized in the ringtone adjustment unit. FIG. 6 shows a flowchart of a method for adjusting and processing ringtone according to the preferred embodiments of the disclosure, and as shown in FIG. 6, taking a mobile phone as the user device as an example for illustration. When the mobile phone receives notifications, such as a call, a short message, etc., a ringtone adjustment flow as shown in the figure is started, and the flow comprises the following steps:

step S602, the mobile phone accurately plays a ringtone, and performs various preparation before playing the ringtone, comprising opening an audio device, opening and reading a ringtone file and decoding data, etc.

Step S604, a speaker is controlled to start to play the ringtone in a low volume, and a ringtone automatic adjustment unit is started. Since ringtone automatic adjustment is selected, the sound usually becomes stronger gradually, and the speaker is controlled to begin to play the ringtone in a low volume. A ringtone automatic adjustment function is started, wherein opening the ringtone adjustment unit and opening a mac to collect data, etc. are comprised.

Step S606, the mac detects environmental data and collects the environmental audio data, and sends the data to the ringtone adjustment unit, and the data comprises the ringtone and noise data at the same time.

Step S608, the ringtone adjustment unit calculates the ringtone strength and signal-to-noise ratio combined with the outputted ringtone data. Since the ringtone adjustment unit stores original data of the ringtone, data processing can be performed on the collected data, and the strength and signal-to-noise ratio of the ringtone are calculated, wherein the two values also respectively represent whether the ringtone suffers abnormal attenuation of the space as well as the magnitude of environmental noise.

Step S610, the ringtone strength and signal-to-noise ratio are used to gradually adjust the ringtone to an anticipated value according to a certain rule, and the ringtone adjustment unit uses the strength and signal-to-noise ratio as parameters to appropriate improve the magnitude of the ringtone according to the pre-set or user-set certain rule. Since each adjustment changes little of the ringtone volume, the ringtone of the mobile phone can be made to be stronger gradually and reaches the anticipated strength and signal-to-noise ratio, thereby reaching comfortable user experience. In order to prevent that under some special situations, even if the parameters are rather good, but the real volume is very low, restrictions on ringtone volume minimum value can be combined so as to ensure the ringtone to reach over a basis strength.

After a certain delay, step S606 is returned to for a next ringtone adjustment, and after a certain delay is to prevent that ringtone adjustment is too frequent and does not play the corresponding role. The step will be cycled until ringtone playing is finished so as to prevent ringtone volume being inaccurate caused by changing the environment during the ring.

II. Automatic Adjustment of a Ringtone of a Mobile Phone as an Assisting Function A mobile phone still uses a normal scene mode to perform ringtone control, but this assisting adjustment function is started in some special cases. For example: if a call is not answered for 20 s, we may think that the user may be in some special environments, and noises may be high or the ringtone is not transmitted fluently, and now a ringtone adjustment function is started to perform environment detection, and if parameters like strength, signal-to-noise ratio, etc. are lower than the reference value corresponding to the ringtone volume, then it can be determined that the current environment requires to appropriately improve the volume so as to attract more attention.

The flow is similar to being as an individual scene mode adjustment, and since the ringtone has been played earlier, it is fine to merely start the ringtone automatic adjustment function and repeat step S606-step S610.

Apparently, those skilled in the art shall understand that the above components and steps of the disclosure can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, in some cases, can perform the shown or described step in sequence other than herein, or they are made into integrated circuit component respectively, or a plurality of components or steps thereof are made into one integrated circuit component. In this way, the disclosure is not restricted to any particular hardware and software combination.

The above description is only preferred embodiments of the disclosure and is not intended to limit the disclosure, and the disclosure can have a variety of changes and modifications for ordinary person skilled in the field. Any modification, equivalent replacement, or improvement made within the spirit and principle of the disclosure shall all fall within the protection scope of the disclosure.

What is claimed is:

1. A method for adjusting and processing ringtone, comprising:
when a user equipment plays a ringtone, acquiring environmental audio data, wherein the environmental audio data comprises: ringtone data played by the user equipment and external environment noise data of the user equipment;
analyzing a characteristic parameter of the ringtone played by the user equipment according to the acquired environmental audio data combined with the played ringtone data; and
adjusting the ringtone played by the user equipment according to the characteristic parameter;
wherein analyzing the characteristic parameter of the ringtone played by the user equipment according to the acquired environmental audio data combined with the played ringtone data comprises: analyzing the acquired environmental audio data combined with the played ringtone data to obtain a strength of a ringtone transmitted to a position of a mac and a signal-to-noise ratio of a ringtone in current environment.

2. The method according to claim 1, when the characteristic parameter of the ringtone comprises the strength of the ringtone, before adjusting the ringtone played by the user equipment according to the characteristic parameter, further comprising:
comparing the strength of the ringtone with a predicted strength corresponding to the magnitude of the ringtone played by the user equipment; and
based on that the difference value between the strength of the ringtone and the predicted strength corresponding to the magnitude of the ringtone played by the user equipment is greater than a first threshold value, determining to adjust the ringtone played by the user equipment.

3. The method according to claim 1, when the characteristic parameter of the ringtone comprises the signal-to-noise ratio of the ringtone, before adjusting the ringtone played by the user equipment according to the characteristic parameter, further comprising:
comparing the signal-to-noise ratio of the ringtone with an anticipated signal-to-noise ratio; and
based on that the signal-to-noise ratio of the ringtone is less than the anticipated signal-to-noise ratio, determining to adjust the ringtone played by the user equipment.

4. The method according to claim 1, wherein adjusting the ringtone played by the user equipment according to the characteristic parameter comprises at least one of the following:
when the characteristic parameter comprises the strength of the ringtone, adjusting the strength of the ringtone played by the user equipment so as to make the strength of the ringtone reach a predetermined ringtone strength; and
when the characteristic parameter comprises the signal-to-noise ratio of the ringtone, adjusting the strength of the ringtone played by the user equipment so as to make the signal-to-noise ratio of the ringtone reach a predetermined ringtone signal-to-noise ratio.

5. The method according to claim 4, after the strength of the ringtone reaches the predetermined ringtone strength and/or the signal-to-noise ratio of the ringtone reaches the predetermined ringtone signal-to-noise ratio, further comprising:
after a predetermined duration, re-acquiring the audio data.

6. A device for adjusting and processing ringtone, comprising:
an acquiring component, configured to acquire environmental audio data when a user equipment plays a ringtone, wherein the environmental audio data comprises: ringtone data played by the user equipment and external environment noise data of the user equipment;
an analysing component, configured to analyze a characteristic parameter of the ringtone played by the user equipment according to the acquired environmental audio data combined with the played ringtone data; and
an adjusting component, configured to adjust the ringtone played by the user equipment according to the characteristic parameter;
wherein the analysing component is configured to analyze the characteristic parameter of the ringtone played by the user equipment according to the acquired environmental audio data combined with the played ringtone data comprising the following step: analyzing the acquired environmental audio data combined with the played ringtone data to obtain a strength of a ringtone transmitted to a position of a mac and/or a signal-to-noise ratio of a ringtone in current environment.

7. The device according to claim 6, further comprising:
a first comparing component, configured to compare the strength of the ringtone with a predicted strength corresponding to the magnitude of the ringtone played by the user equipment; and
a first determining component, configured to, based on that the difference value between the strength of the ringtone and the predicted strength corresponding to the magnitude of the ringtone played by the user equipment is greater than a first threshold value, determining to adjust the ringtone played by the user equipment.

8. The device according to claim 6, further comprising:
a second comparing component, configured to compare the signal-to-noise ratio of the ringtone with an anticipated signal-to-noise ratio; and
a second determining component, configured to, based on that the signal-to-noise ratio of the ringtone is less than the anticipated signal-to-noise ratio, determining to adjust the ringtone played by the user equipment.

9. The method according to claim 6, wherein the adjusting component is configured to adjust the ringtone played by the user equipment according to the characteristic parameter, comprising at least one of the following:
when the characteristic parameter comprises the strength of the ringtone, adjusting the strength of the ringtone played by the user equipment so as to make the strength of the ringtone reach a predetermined ringtone strength; and
when the characteristic parameter comprises the signal-to-noise ratio of the ringtone, adjusting the strength of the ringtone played by the user equipment so as to make the signal-to-noise ratio of the ringtone reach a predetermined ringtone signal-to-noise ratio.

* * * * *